United States Patent Office 3,422,432
Patented Jan. 14, 1969

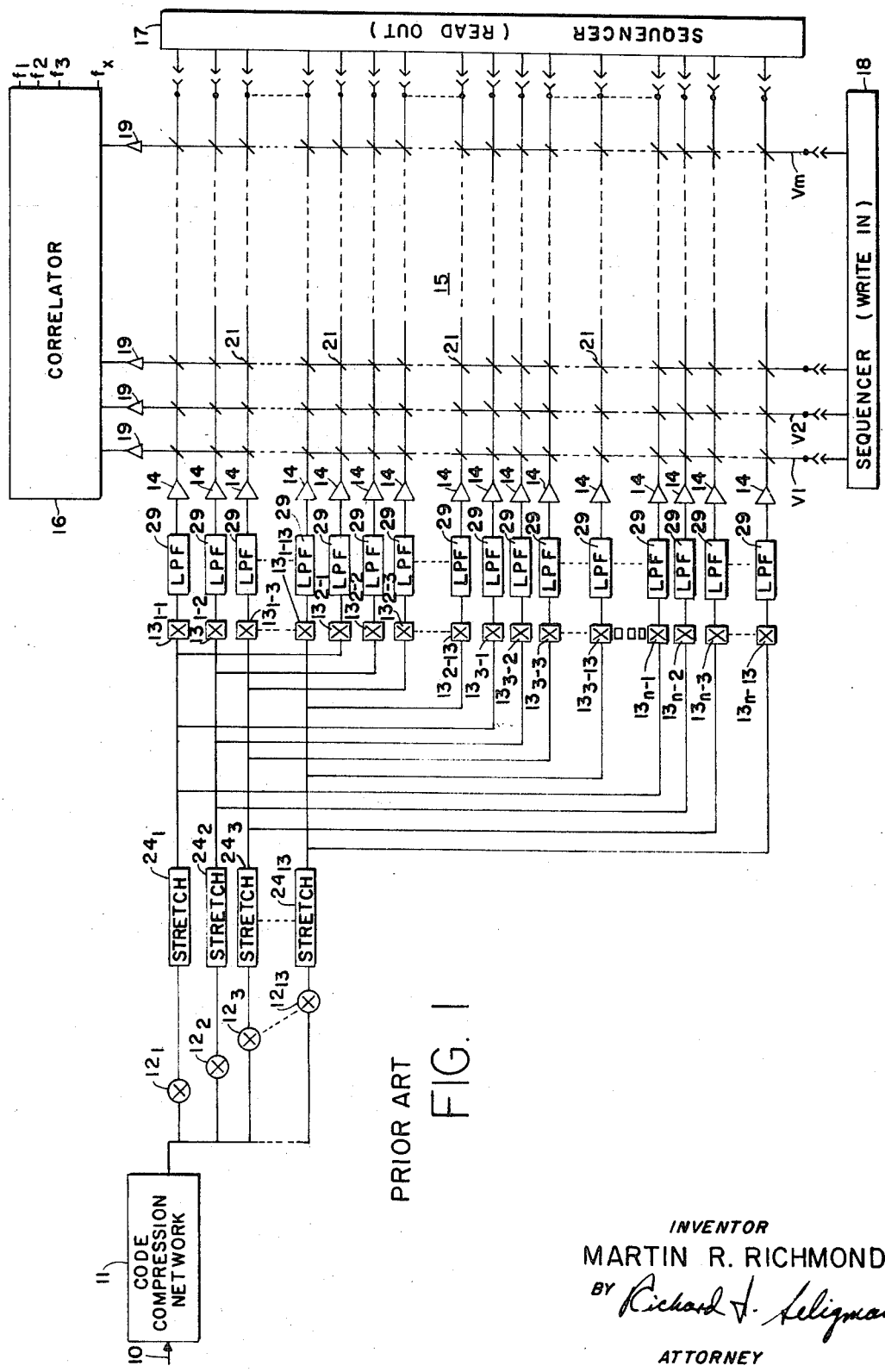
PRIOR ART
FIG. I
INVENTOR
MARTIN R. RICHMOND
BY Richard H. Seligman
ATTORNEY

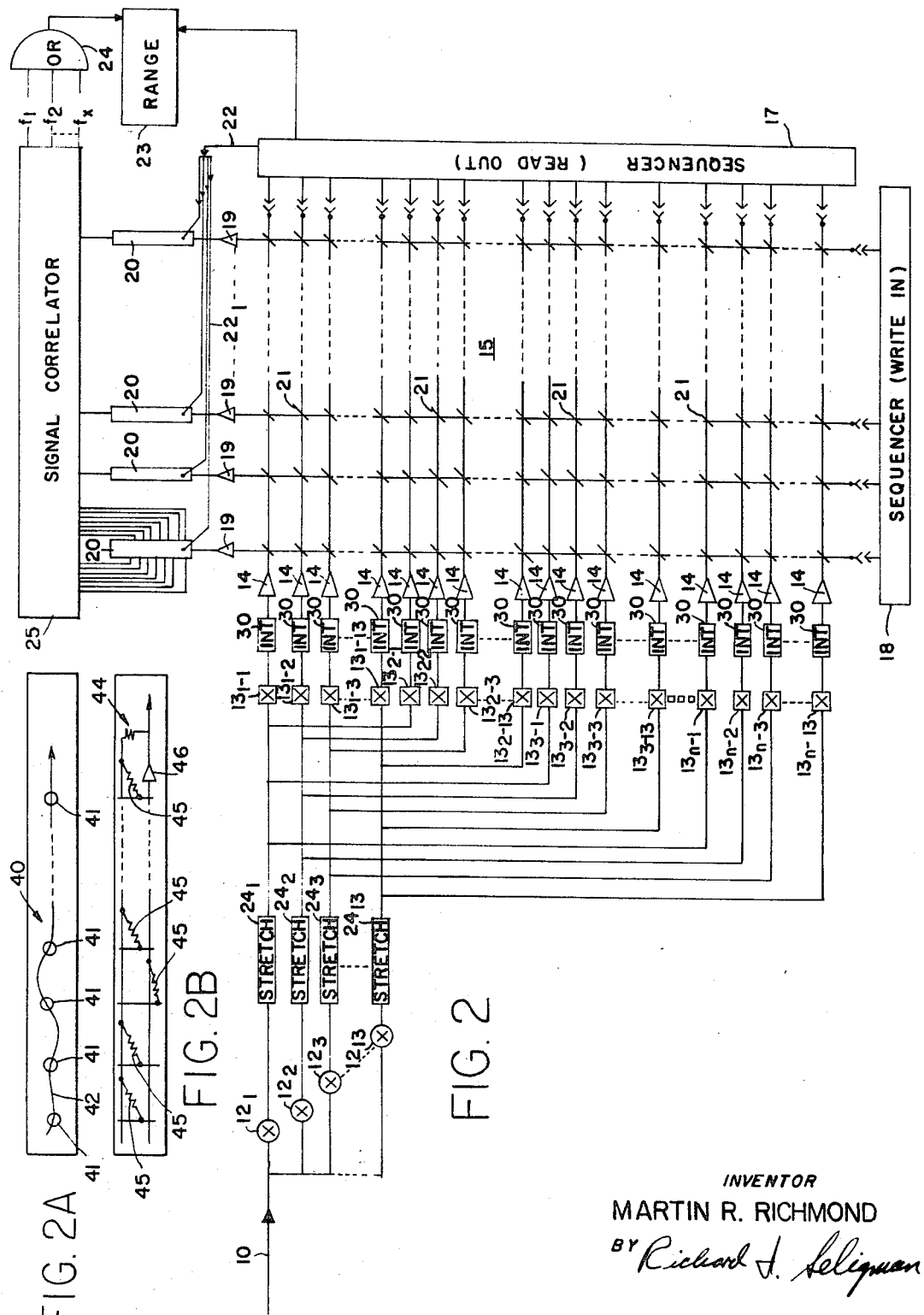

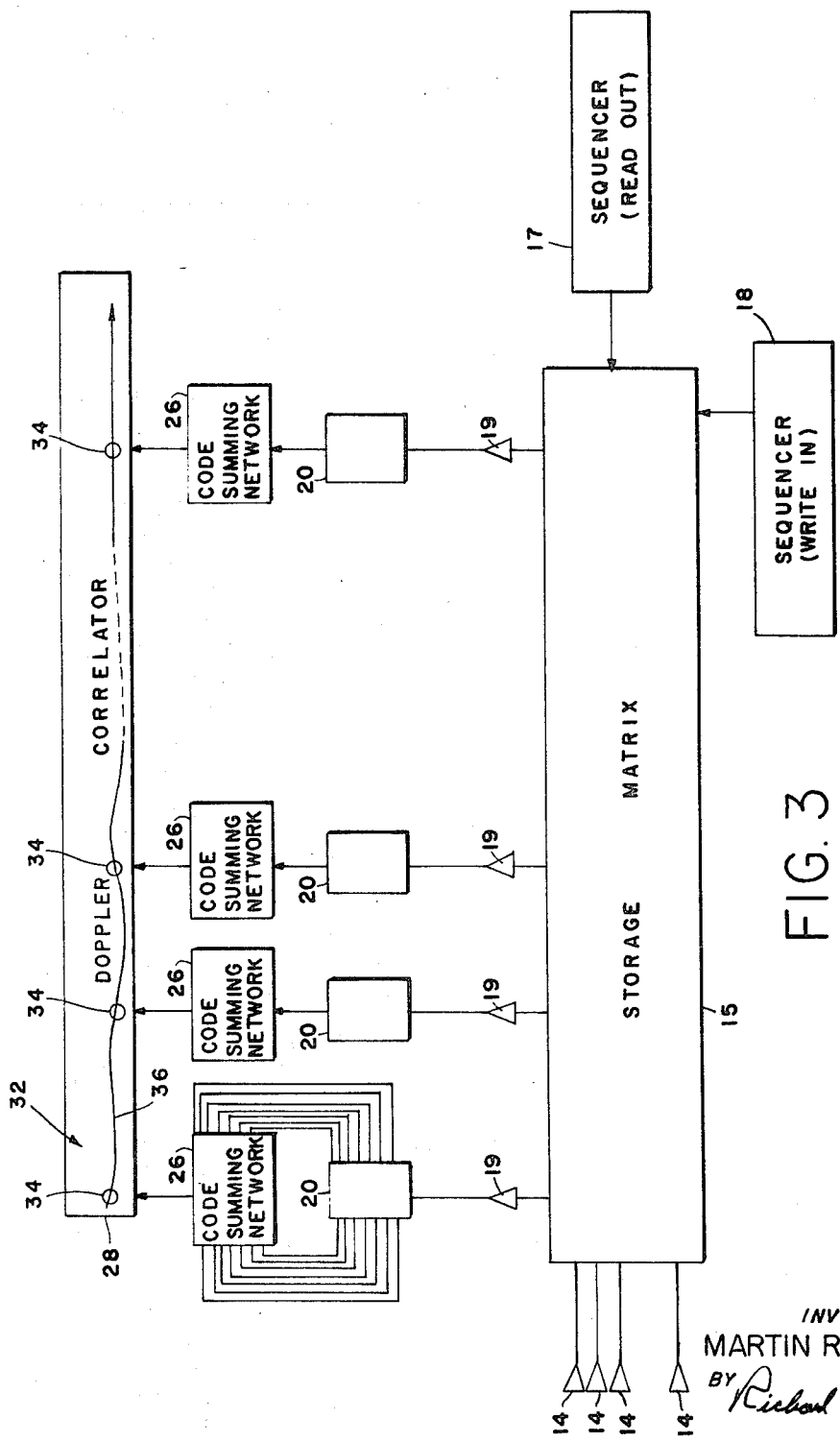

3,422,432
SIGNAL IDENTIFICATION APPARATUS
Martin R. Richmond, Belmont, Mass., assignor to Sanders Associates, Inc., Nashua, N.H., a corporation of Delaware
Filed Oct. 9, 1967, Ser. No. 673,873
U.S. Cl. 343—17.1                                25 Claims
Int. Cl. F01s 7/28

ABSTRACT OF THE DISCLOSURE

Apparatus is herein disclosed for large dynamic range signal processing. The apparatus includes a magnetic core matrix in which samples of modulated coded signals to be recognized are stored. The matrix is coupled to a set of shift registers, one of which is coupled to each column of the storage core matrix. The rows of the matrix can be sequentially read out into the shift registers which are each tapped at selected stages in accordance with the code so that the signal is identified when an output appears simultaneously at all said selected stages of any shift register. The outputs from the taps of the shift register are coupled to a correlating network containing a multiplicity of summing networks each arranged to provide maximized output when a signal containing the modulation to be recognized is applied thereto.

Background of the invention

The dynamic range (ratio of strongest to weakest useful signal) or degree to which fine gradations in amplitude of signal information can be digitally recovered is dependent upon the number of bits of signal available for analysis.

In many varied applications (such as data processing systems, speech recognition systems, etc.), a single signal is a function of more than one independent variable. The signals employed in Doppler radar systems illustrate this point well, in that return signals from targets contain range as well as velocity information. For example, in an exemplary pulse Doppler radar system there is transmitted a coded signal comprising a 13-bit code generated at a 50% duty cycle. The return signals from targets will contain the code delayed in time as a function of range and modulated as a function of velocity.

Generally, the return signals are decoded using pulse compression techniques and gated to provide range information. After range processing, the Doppler modulation is recovered to ascertain velocity.

One method of recovering the modulation is found in my copending patent application for "Signal Correlator Apparatus," Ser. No. 486,140, filed Sept. 9, 1965. This application references use of a correlator network for recovering Doppler information. After range gating, rather than employing Doppler filters to examine for the presence of Doppler information, indicative of target speed, apparatus is disclosed in which the output from each gate is sampled, stored, and then applied to a plurality of correlator networks, each of which is arranged to recognize or correlate with a particular Doppler signal.

In the above, the outputs from the range gates are sampled and stored within a magnetic memory core matrix, the samples stored in each row of the matrix representing outputs from individual range gates, that is, one matrix row for one range. The correlator network includes a plurality of weighted resistor networks coupled to the columns of the storage matrix, with each resistor network arranged to sum separately outputs appearing on the vertical columns as each horizontal row is read out. Thus, when a particular row of the storage matrix is read out, it will produce in one of the resistor correlator networks a maximized signal when that particular network is designed to recognize the particular time, phase or amplitude characteristic of the signal stored in the row, here being a particular Doppler frequency. Each resistor network is coupled to a threshold detector which, in the event of a substantial correlation between the signal as read out of the storage matrix and that resistor network, will provide an indication.

A second system for recovering modulation is found in a patent application for "Signal Correlator," Ser. No. 626,164, filed Mar. 27, 1967, and assigned to the assignee of this application. In that application, magnetic correlators replace the aforementioned resistor correlators. Furthermore, in order to enhance signal-to-noise ratio, that potion of the signal which contributes minimum information (for example 30° either side of the 0° crossover point of a sine wave) is ignored, and no cores of the correlator networks are used to correlate with samples taken at these points. The core correlator networks comprise arrangements of cores grouped to geneate a maximum signal responsive to a particular stored signal.

In a typical example, the output signal from each range gate is time sequentially sampled 200 times, which would provide 200 bits of information under ideal conditions. However, the maximum efficiency of utilization of these bits is relatively low, because of the nonuse of correlator cores at the point where the signal to be correlated is 30° either side of the 0° crossover, and also because in a typical pulse Doppler radar system a 50% keying is imposed; that is, the transmitter operates one-half the time and the receiver the other half. Thus, instead of 200 bits of information being stored for each range, only 66 *usable* bits are stored. That is, only 66 samples are employed in the correlation. With 66 samples available, the dynamic range is only 66 to 1, which in many applications is quite satisfactory. However, in other applications and situations, additional dynamic range (a finer gradation) is highly desirable.

Additional bits can be obtained by taking more samples at a faster sampling rate. However, this requires greatly increased hardware expenditure.

A typical prior art embodiment is discussed hereinafter in order to more clearly indicate the limitations (outlined above) involved in an actual situation. Embodiments of the invention consistent with the prior art embodiment are then set forth, clearly showing how these limitations have been alleviated.

Summary of the invention

Briefly, the invention comprises apparatus for handling signals containing at least two variables of information, including means for deriving from the signals the information contained therein with increased dynamic range in order to resolve very small signals in the presence of much larger signals.

The input signals, which in an exemplary embodiments comprise return signals from targets in a pulse Doppler radar system, are coded by, for example, a 13 bit Barker code. The input signals are applied to a plurality of range gates arranged to "open" in serial fashion such that one bit of each signal code from each target will pass through one of each of the gates. The output from the gates containing the second variable as a Doppler modulation thereon is sampled and stored in a core matrix comprising a plurality of rows and columns, 1 row for each bit of the code (13 rows in this example) and 1 column for each sample taken (200 columns for 200 samples). To resolve coarse range ambiguities a plurality of noise correlators can be provided, thus necessitating additional rows in the storage matrix, since a matrix row is then required for each noise correlator.

The signal inputs of a plurality of 13 stage shift registers are coupled to the output columns of the core storage matrix. Selected output taps of the shift registers are coupled to a correlator matrix to recognize Doppler modulated code.

Alternately, the signal inputs of a plurality of 13 stage shift registers are coupled to the output columns of the core storage matrix for indictaing range correlation, with selected output taps from the shift registers fed to resistor correlator networks which correlate the 13 bits of range information. The outputs of these code correlator networks are applied to a Doppler correlator matrix comprising, in a preferred embodiment, arrangements of magnetic cores grouped to algebraically sum the samples of signals presented thereto, to thus produce a maximized output signal when the signal(s) to be recognized is applied.

If each signal is effectively sampled at a 67% sampling rate using 3-level simulation of sine waves as taught by the aforementioned patent application Ser. No. 626,164 and 200 samples are taken of the input signal which is generated at a 50% duty cycle, and the 13 bits of the code are correlated by the shift registers, rather than have a dynamic range of 66 to 1; the dynamic range becomes 13×66 to 1, or 858 to 1.

Accordingly, it is an object of this invention to provide improved apparatus for a digital processor.

It is another object of this invention to provide a digital processor having increased dynamic range.

It is a further object of this invention to provide improved apparatus for decoding signals containing more than one variable of information at increased dynamic range.

*Brief description of the drawings*

The above-mentioned and other features and objects of this invention will become more apparent by reference to the following description, taken in conjunction with the accompanying drawings, in which:

FIG. 1 is a block diagram illustrating a digital processor constructed according to the prior art;

FIG. 2 is a block diagram illustrating an embodiment of a digital processor constructed according to the principles of this invention;

FIG. 2A is a sketch of a core correlator;

FIG. 2B is a sketch of a resistor correlator; and

FIG. 3 is a block diagram illustrating a modification of the embodiment of FIG. 2.

*Description of a prior art embodiment*

Referring now to FIG. 1, there is illustrated thereby a digital signal processor arranged according to prior art teachings. The function of the equipment illustrated is to recover information from a signal containing at least two independent variables, for example, in a pulse Doppler radar system the two variables could be range and velocity of targets, velocity being determined by employing the Doppler principle.

The signal in question is a coded signal, preferably a Barker code, to minimize side lobe problems, thus, for illustration purposes it will be assumed that the signal is a 13 bit code assuming the form 1111100110101. It is assumed also that the puses of the code are each 10 nanoseconds wide (equivalent to 5 feet of range), thus, one length of code is 130 nanoseconds wide.

The coded signal(s) is further modulated, for example, by a Doppler signal(s) from a target(s) if the principles of the invention are employed in a radar application. Since the 13 bit code length is repetitive, the code can be further modulated by, for example, noise to resolve the ambiguity. For example, the code transmitted is time compared to the code received to ascertain range. However, since a repetitive code is used which repeats every 130 nanoseconds (equivalent to 65 feet of range), there exists an $n65$ ambiguity. That is, the code comparison resolves that the target is at, for example, 1000', 1065' or 1130', or it is at 1005', 1070' or 1135', but does not resolve the course ambiguity. An output from a range gate will indicate a target at, for example, 1000 ft. or $1000+n65$ feet where $n$ is an integer, while an output from a second range gate indicates detection of a target at 1005 feet or $1005+n65$ feet. Hence, to resolve this course ambiguity the signal is further modulated by another signal when transmitted, for example, random noise, and after the fine ambiguity is resolved, then the random noise is used to resolve the course ambiguity.

For purposes of illustration only, the principles of the invention will be disclosed in their application to a Doppler radar, although it is emphasized that these principles of signal processing defined herein have a much broader scope than this single application.

In the prior art system of FIG. 1, a signal to be processed is applied at line 10 to a compression network 11 which compresses the 13 bit code into a single pulse, time situated according to fine range. This pulse is then fed simultaneously to a plurality of gates $12_1$–$12_{13}$ which are caused to open in time succession such that only one gate will be "open" to pass the pulse, thus providing resolution of fine range, although the course ambiguity still exists. The outputs from the gates 12 are then applied to a plurality of noise correlators 13 which have as second inputs thereto a history of the noise modulation impressed on the signal when transmitted. The noise correlators resolve the coarse ambiguity and supply an appropriate output. The noise correlators either reverse the polarity of the incoming pulse or leave it as is in accordance with a delayed version of the original modulation impressed on the signal during transmission. A series of noise correlators $13_1$–$13_n$ is provided for the outputs from each of the range gates $12_1$–$12_{13}$, $n$ being determined by the number of potential increments of target range, that is, the range of interest over which possible signals will be received. Course ambiguity is resolved after range gating in order to minimize high frequency problems. Prior to range gating 100 megacycle signals were employed, while after range gating the signal frequency has been reduced to approximately 7 megacycles ($100 \div 13$), for example, by expanding after range gating in a series of pulse stretching networks $24_1$–$24_{13}$.

The outputs from noise correlators 13 are operated upon by a plurality of low pass filters 29 where all but the Doppler frequencies are removed and then are sampled and applied to a storage matrix 15 which comprises a multiplicity of magnetic cores arranged in rows and columns, one row for each noise correlator and one column for each sample taken. The signals from the noise correlators after low pass filtering are limited and amplified by units 14 to provide a suitable square wave signal. This signal is applied to the horizontal rows of the storage matrix. The signal is of sufficient strength so as to switch the magnetic storage cores 21 when applied thereto coincident with a signal applied to the vertical rows by a write in sequencer 18. The vertical rows are pulsed sequentially at the sampling rate by sequencer 18. In this manner, the time polarity characteristics of each output signal from noise correlators 13 are recorded on the magnetic core rows of the storage matrix. This procedure for storing the time polarity characteristics of input signals within a core matrix is disclosed in detail in the aforementioned patent application Ser. No. 486,140.

Thus, each horizontal row of the storage matrix contains information re the time polarity characteristics for targets detected at a particular range.

Coupled to the vertical columns of storage matrix 15 is a matrix 16. Matrix 16 comprises networks grouped to algebraically sum the samples of signals to be recognized to produce a maximized signal when the signals to be recognized are applied thereto. These networks are illustrated in greater detail in the aforementioned patent applications Ser. No. 486,140 for a resistor correlator and Ser. No. 626,164 for a core correlator. The networks store programs of various selected Dopplers.

As each horizontal row wire of the storage matrix is read-out by a sequencer 17 (each row storing a target at a particular range), the read-out signals are applied to the correlator matrix which is designed to ascertain the Doppler frequency $f_1-f_x$ of the signal at the particular range.

*Description of preferred embodiments*

Referring now to FIG. 2, there is illustrated a preferred embodiment of a digital signal processor having greatly increased dynamic range capabilities over the digital processor of FIG. 1, previously described.

The input signal to this system is the received input from, for example, target detected in a pulse Doppler radar system. As previously described with reference to FIG. 1, it is assumed for explanation purposes that the input signal is a 13-bit code assuming the form 1111100110101. Each bit length is equal to the duration of the return signal from one range resolution cell (equivalent to approximately 5 feet of distance). This input signal is applied to a plurality of range gates $12_1-12_{13}$, which gates open in time succession such that only one bit of the 13-bit code signal from any single target will pass through a single gate. If the selected code has more or less than 13 bits, the number of range gates required is determined accordingly. Single bits from target signals will also pass through this same gate. For example, if there is a target at 1000 feet, range gate $12_3$ may contain bit 1 of the code signal from the target, range gate $12_4$ bit 2, etc. As above, bandwidth reduction is accomplished after range gating by, for example, expanding the output pulses in a series of pulse stretching networks $24_1-24_{13}$.

The outputs from each of the stretch networks are coupled to a plurality of noise correlators 13 for resolving coarse ambiguity of the signals. For example, the outputs from range gate $12_1$ is applied to noise correlators $13_{1-1}$–$13_{n-1}$, the outputs from range gate $12_2$ is applied to noise correlators $13_{1-2}$–$13_{n-2}$, etc., such that each range gate output is examined by as many noise correlators 13 as there exists $n65$ ambiguities. That is, the number of noise correlators required is determined by the distance (range) to be observed divided by 5. An integrator 30 is coupled to the output of each noise correlator 13. Integrators 30 integrate the signal from the noise correlators for a period of time equivalent to the time between samples to be taken (discussed hereinafter). As in FIG. 1, low pass filters could be substituted for integrators 30. The outputs from the correlators 13 after integration are then sampled and applied via a series of limiter-amplifiers 14, to the horizontal rows of a core matrix 15 in similar fashion to that already described in FIG. 1. The outputs from each integrator 30 is assigned to a particular horizontal row of storage matrix 15, which comprises a multiplicity of magnetic cores 21 arranged at the intersections of the rows and columns of the matrix. The number of vertical columns $V_1-V_m$ is determined by the number of samples of the signal to be stored. Each of the vertical columns of matrix 15 is coupled via amplifier 19 to a code or digital correlator 20 which, in this embodiment, comprises a shift register. Predetermined tapped outputs from each of shift registers 20 are, in turn, coupled to a correlator network 25 constructed in accordance with the teachings of patent applications Ser. Nos. 486,140 and 626,164, above-mentioned.

Correlators network 25 can be constructed as a core correlator or a resistor correlator.

FIG. 2A is a sketch illustrating a core correlator with only one summing network being shown for illustration purposes. In practice there would be as many summing networks ast here are signals to be recognized. The correlator of FIG. 2A comprises a multiplicity of summing networks 40 of magnetic cores 41 so wired (stitched) by a corresponding multiplicity of stitch wires 42 so as to recognize signals applied thereto. The cores 41 of the stitch network 40 of the correlator are stitched in such a manner as to algebraically sum the signals presented thereto so as to produce a maximized output signal from a stitch or summing network when the signal to be recognized is applied thereto. In the preferred embodiment the magnetic cores are small toroidal cores having normal linear transformer magnetic characteristics.

FIG. 2B is a sketch illustrating a resistor correlator with only one summing network being shown for illustration purposes. This correlator comprises a multiplicity of summing networks 44 of resistors 45, each arranged to sum outputs representing the positive and negative portions of a particular signal. The negative portion of the signal is subsequently passed through an inverter 46 and summed with the output of the positive portion of the signal.

Operation of this embodiment is very much different from the embodiment of FIG. 1, in that range is not resolved prior to storage of the sampled signals in matrix 15.

The input code signal is not compressed prior to range gating, but applied intact to range gates $12_1-12_{13}$ such that only one bit of each 13-bit code will pass through one range gate. These range gated bits are then correlated to resolve coarse ambiguity in noise correlators 13 with the outputs from the noise correlators 13 after integration being sampled and stored within storage matrix 15.

The range and Doppler information is resolved by successive reading out of the rows of the storage matrix 15 into shift registers 20, employing a read out sequencer 17 causes the cores 21 of matrix 15 to be destructively readout and which shifts the shift register. Various positive and negative taps, selected in accordance with the employed code, of the shift register are coupled to correlator 25 in a manner such that the correlator will generate a maximum signal upon recognition of the code modulated by a particular Doppler signal. Furthermore, when a signal is identified by correlator 25, sequencer 17 will be interrogated to ascertain which rows of the matrix 15 provided Doppler correlation, which rows signifiy a particular range. This range value can be indicated in unit 23, which can be a counter advanced by sequencer 17, with the count stored therein being read out when correlator 25 indicates a correlation via an OR gate 24. Alternately, the sequencer 17 could be employed for the range positioning of the spot on a PPI presentation and the correlator output 24 used to intensity modulate the trace for a normal PPI display.

Because more bits of signal information are available from which to derive the desired information, the dynamic range of this system is increased substantially. Using the figures previously mentioned, the dynamic range is increased by a factor of 13, in that information resolution is carried out with (13×66) bits of storage information, rather than just 66 bits as was the case in the prior art embodiment of FIG. 1.

FIG. 3 illustrates a portion of another embodiment of the invention. As described above with reference to FIG. 2, the outputs from the integrator 30 (not shown in FIG. 3) are applied via a series of limiter-amplifiers 14 to a storage matrix 15 employing write in sequencer 18. The signals stored in matrix 18 are then read out of the rows of the storage matrix into a series of shift registers 20 via a series of amplifiers 19 as described hereinabove. As before, shift registers 20 are tapped at various positive and negative taps thereof selected in accordance with the employed code. However, rather than apply the tapped outputs directly to a correlator which is stitched in accordance with both the code and various Dopplers, the outputs from shift registers 20 are applied to a series of code summation networks 26 which comprise correlator networks constructed preferably in accordance with the teachings of patent application Ser. No. 486,140, above mentioned. These code summing networks are arranged each to generate a maximum signal upon "recognition" (reception) of the particular code employed. The outputs from the code summing networks 26 are then applied to a Doppler correlator 28, as above. In this embodiment the Doppler correlator need only be stitched (wired) to recognize particular Doppler signals, rather than being stitched to recognize the code modulated by Dopplers as in FIG. 2.

In one embodiment, Doppler correlator 28 comprises a multiplicity of summing networks 32 (one only being shown here) of magnetic cores 34 so wired (stitched) by a corresponding multiplicity of stitch wires 36 so as to recognize signals applied thereto.

Although the concepts of the invention have been described in connection with a pulse Doppler radar system, it is to be understood that the embodiments shown are to be regarded as illustrative only, and that many variations and modifications may be made without departing from the principles of the invention herein disclosed and defined by the appended claims.

What is claimed is:

1. Apparatus for identifying modulated coded digital signals, comprising:
   means for storing samples of said modulated coded digital signals;
   means for reading out said stored samples;
   means responsive to said read out stored samples,
   said means responsive having a plurality of predetermined outputs selected in accordance with the code; and
   a signal correlation network coupled to said means responsive outputs,
   said signal correlation network having at least one summing network which is arranged to identify a particular modulated coded digital signal applied thereto.

2. Apparatus for identifying modulated coded digital signals as defined in claim 1, in which said means for storing samples includes an orthogonal storage matrix having a multiplicity of bilevel logic elements arranged in rows and columns, with an electrical conductor coupled to said logic elements of each row, and an electrical conductor coupled to said logic elements of each column.

3. Apparatus for identifying modulated coded digital signals as defined in claim 2, in which said means for reading out said stored samples includes means for sequentially applying read out pulses to the conductors connecting said rows of bilevel logic elements.

4. Apparatus for identifying modulated coded digital signals as defined in claim 3, in which said means responsive includes a plurality of shift registers coupled to the columns of said orthogonal storage matrix, said shift register being shifted at the rate at which said sequential read out pulses are applied.

5. Apparatus for identifying modulated coded digital signals as defined in claim 2, in which said means responsive includes a plurality of shift registers one being coupled to each column of said orthogonal storage matrix.

6. Apparatus for identifying modulated coded digital signals as defined in claim 1, in which said means responsive includes a plurality of shift registers each of which is tapped at predetermined positive and negative taps selected according to the code.

7. Apparatus for identifying modulated coded digital signals as defined in claim 1, in which said summing networks of said signal correlation networks includes an arrangement of elements grouped to sum substantially all of a multiplicity of simultaneously presented samples representing a particular modulated coded digital signal.

8. Apparatus for identifying modulated coded digital signals as defined in claim 7, in which said elements are summing resistors.

9. Apparatus for identifying modulated coded digital signals as defined in claim 7, in which said elements are magnetic cores.

10. Apparatus for identifying modulated coded digital signals as defined in claim 9, in which said magnetic cores are toroids having linear transformer magnetic characteristics.

11. In a pulse Doppler radar system in which the transmitted signal is comprised of a digital code modulated by noise, a receiver signal processor, comprising:
    a plurality of range gates;
    a multiplicity of noise correlators, predetermined groups of which are coupled to each one of said range gates;
    storage means coupled to said noise correlators;
    a plurality of code correlators coupled to said storage means; and
    a correlator network coupled to said code correlators.

12. A signal processor as defined in claim 11, in which said plurality of range gates includes one range gate for each bit of said digital code.

13. A signal processor as defined in claim 12, in which said storage means includes an orthogonal storage matrix comprising a multiplicity of bistable logic elements arranged in rows and columns, an electrical conductor connected to the bistable logic elements of each row of bistable logic elements, and an electrical conductor coupled to the bistable elements of each column of bistable logic elements.

14. A signal processor as defined in claim 13, in which said code correlators includes a plurality of shift registers, one coupled to each column of said orthogonal storage matrix, said shift registers each having a plurality of outputs taken at predetermined positive and negative taps thereof, said predetermined taps selected in accordance with said code.

15. A signal processor as defined in claim 14, in which said correlator network is coupled to said shift register tapped outputs.

16. A signal processor as defined in claim 15, in which said correlator network comprises at least one summing network of elements arranged to recognize a particular Doppler code signal.

17. A signal processor as defined in claim 11, further including a plurality of pulse stretching networks coupled from said range gates to said noise correlators.

18. A signal processor as defined in claim 11, further including a plurality of integrators coupled from said noise correlators to said storage means.

19. Apparatus for identifying modulated digital coded signals comprising:
    means for storing samples of said modulated coded digital signals;
    means for reading out said stored samples;
    means responsive to said read out stored samples, said means responsive having a plurality of predetermined outputs selecting in accordance with the code;
    a plurality of code summing networks coupled to said means responsive outputs; and
    a signal correlation network coupled to said code summing network, said signal correlation network having at least one summing network which is arranged to identify a particular modulation of signals applied thereto.

20. Apparatus for identifying modulated coded digital signals as defined in claim 19, in which said code summing networks each includes arrangements of elements grouped to sum substantially all of said means responsive outputs representing a particular digital code.

21. In a pulse Doppler radar system in which the transmitted signal is comprised of a digital code modulated by noise, a receiver signal processor, comprising:
    a plurality of range gates;
    a multiplicity of noise correlators, predetermined groups of which are coupled to each one of said range gates;
    storage means coupled to said noise correlators;
    a plurality of code correlators coupled to said storage means;

a plurality of code summing networks coupled to said code correlators; and a Doppler correlator network coupled to said code summing networks.

22. A method for resolving range and Doppler of received target signals after transmitting a signal comprised of a digital code modulated by noise, comprising the steps of:

range gating the received signals;
noise correlating the range gate signals;
storing the noise correlated signals;
code correlating the stored signals; and
correlating the code correlated signals with predetermined programs representing various code Dopplers.

23. A method as defined in claim 22, further comprising the step of:

ascertaining which stored signals provided Doppler correlation in order to resolve range.

24. A method for resolving range and Doppler of received target signals after transmitting a signal comprised of a digital code modulated by noise, comprising the steps of:

range gating the received signals;
noise correlating the range gated signals;
storing the noise correlated signals;
code correlating the stored signals;
summing the code correlated signals with a predetermined program representing the digital code; and
correlating the summed code correlated signals with predetermined program representing the digital code; and
correlating the summed code correlated signals with predetermined programs representing various Dopplers.

25. A method as defined in claim 24, further comprising the step of:

resolving range by ascertaining which stored signals provided Doppler correlation.

References Cited

UNITED STATES PATENTS

| | | | |
|---|---|---|---|
| 3,223,997 | 12/1965 | Clark et al. | 343—5 X |
| 3,355,579 | 11/1967 | Robertson | 343—100.7 |

RODNEY D. BENNETT, *Primary Examiner.*

CHARLES L. WHITHAM, *Assistant Examiner.*